Jan. 14, 1958  C. E. TACK  2,819,894
AXLE ASSEMBLY
Filed Oct. 21, 1953
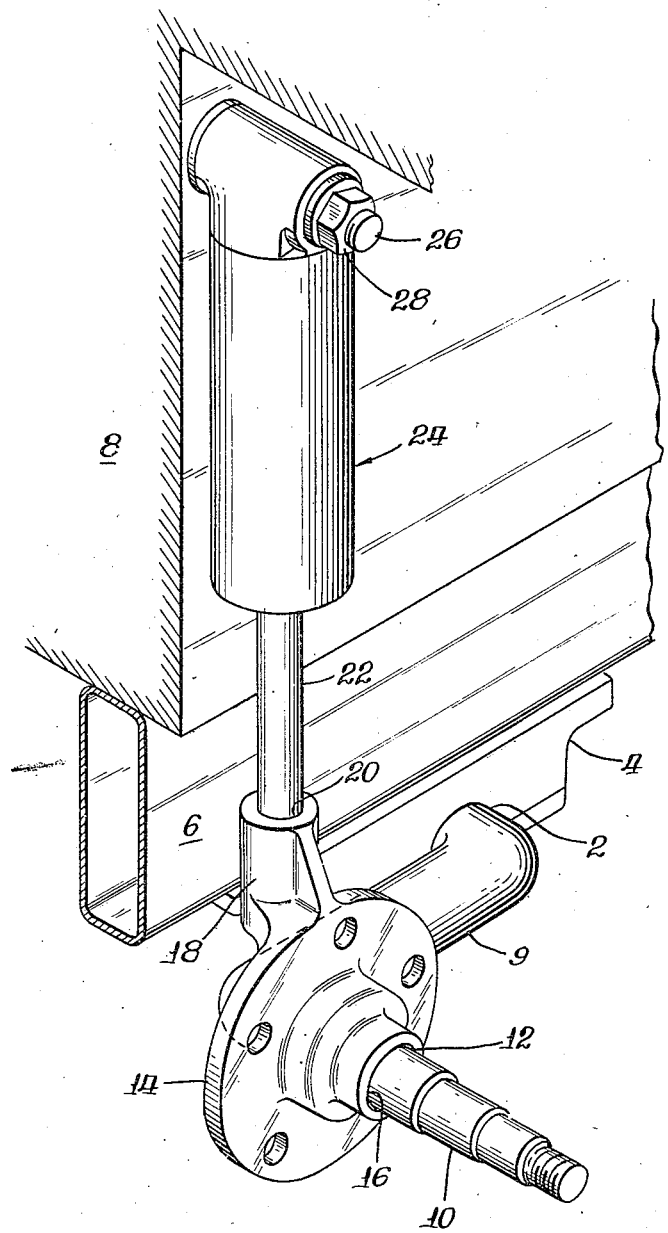
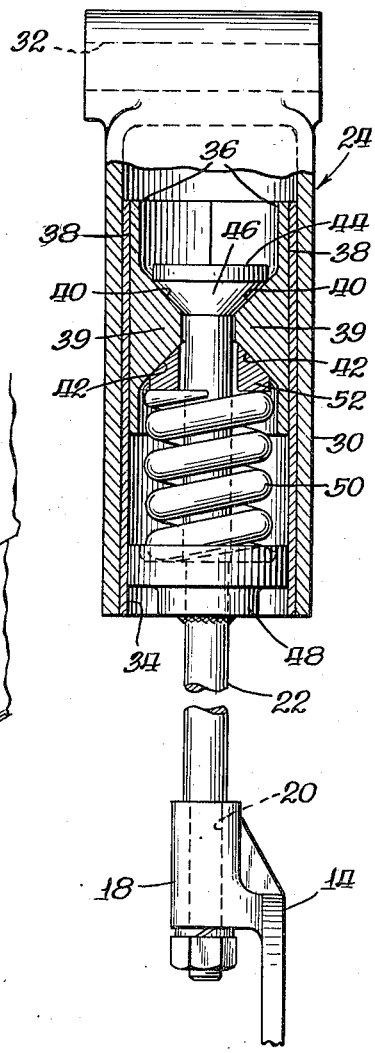
INVENTOR.
Carl E. Tack
BY
O. B. Garner
Atty.

United States Patent Office 2,819,894
Patented Jan. 14, 1958

2,819,894

AXLE ASSEMBLY

Carl E. Tack, Chicago, Ill., assignor to American Steel Foundries, Chicago, Ill., a corporation of New Jersey Application October 21, 1953, Serial No. 387,351

10 Claims. (Cl. 267—9)

The invention relates to a novel axle assembly of the trailing wheel type and particularly to an arrangement affording improved vehicle supporting and riding quality.

The invention comprehends an improved axle assembly of the type disclosed in Patent No. 2,455,787, issued December 7, 1948, to Frank F. Linn, and Patent No. 2,668,051, issued February 2, 1954, to Albert F. Seelig, Jr.

In particular, the invention involves the utilization of torque distributing and shock absorber means in an axle assembly of the type described, whereby improved riding qualities are afforded the supported vehicle.

It is a principal object of the invention to utilize a piston type friction shock absorber in an axle assembly of the type described.

It is an additional object of the invention to incorporate a movable brake flange which in turn cooperates with a friction type shock absorber to distribute braking torque to the vehicle body and to snub resilient action of the assembly.

These and other objects will become apparent in the course of the following description and from an examination of the concerned drawings, wherein:

Figure 1 is a fragmentary perspective view illustrating the general arrangement of the axle assembly, and Figure 2 is a fragmentary vertical sectional view taken through the shock absorber along the vertical central axis thereof.

It will be noted that the figures illustrate only one end of the novel axle assembly, it being understood that the structure shown is duplicated on the other side of the assembly.

In describing the invention reference is made to the above mentioned patents, wherein a trailing type axle assembly is disclosed and its functional operation is described in detail. In general, an axle assembly of this type employs a main shaft 2, journalled for rotation in a bearing bracket 4, said bearing bracket being secured to the underside of a trailer frame 6 which in turn supports a vehicle body 8. Immediately outboardly of the bracket 4 a crank 8 is provided on the main shaft 2, said crank extending transversely and preferably perpendicular to the axis of the main shaft 2. On the end of the crank 8 remote from the shaft 2 an outwardly extending spindle 10 is provided, said spindle offering journal mounting for a conventional wheel (not shown) which in turn supports the related vehicle. Although not shown in the instant drawings, it will be understood by referring to the mentioned patents, that spring means, preferably a coiled spring, is disposed to surround the main shaft 2 and have its opposite ends fixed to the bracket 4 and to the shaft 2, whereby rotation of the spindle 10 about the axis of the main shaft is resiliently resisted and thus the axle assembly offers flexible support for the associated vehicle.

Adjacent the inboard end of the spindle 10 a shouldered bearing surface 12 is provided. A brake flange or stator 14 having a centrally disposed aperture 16 is sleeved for rotational movement on the bearing surface 12 of the spindle 10. A brake mechanism to decelerate the vehicle, such as any conventional brake shoe arrangement (not shown) may be attached to the stator 14 to operatively engage a braking surface such as a drum (not shown) carried by the associated wheel (not shown).

In the associated drawings it will be noted that the stator 14 is provided with an inwardly offset upwardly directed boss 18, said boss having a generally vertically directed aperture 20 therein, said aperture receiving one end of an arm 22 which forms an operating part of a shock absorber indicated generally at 24. The shock absorber 24 is pivotally attached at the upper end thereof to a pin 26 which is secured to the vehicle body 8. A conventional thread and nut arrangement 28 is provided to retain the shock absorber 24 in proper position on the pin 26.

By referring to Figure 2, which illustrates in cross section the shock absorber 24, it will be noted that said absorber comprises an upper cylindrical member 30 having an aperture 32 on its upper end receiving the pin 26. In the preferred embodiment the cylindrical member 30 is seen to be hollow providing a cylindrical friction surface 34 on the inside thereof. A plurality of friction shoes 36 each having an arcuate surface 38 is arranged to engage the friction surface 34 of the cylinder 30. The shoes 36 are generally movable longitudinally of the hollow cylinder 30. Additionally, the shoes 36 present inwardly directed lugs 39, 39, said lugs being provided with upper and lower converging wedge surfaces 40 and 42, respectively. One end of the flange connected arm 22 is telescoped within the cylinder 30 and presents a wedge 44 at the upper end thereof, said wedge having a downwardly directed surface 46 in engagement with the upper wedge surfaces 40 of the shoes 36. Intermediate its ends the arm 22 has fixedly mounted thereon a spring seat 48, said spring seat receiving one end of a coiled spring 50, the latter being arranged to surround the adjacent portion of the arm 22. A movable wedge 52 is positioned intermediate the seat 48 and the first mentioned wedge 44 in such a manner as to abut the end opposite the mentioned end of the spring 50. Thus it will be seen that the spring 50 reacting between the movable wedge 52 and the fixed seat 48 urges the fixed wedge downwardly into engagement with the upper wedge surfaces 40 of the shoes 36 while urging the movable wedge 52 upwardly into engagement with the lower wedge surfaces 42 of the shoes 36.

In the operation of the novel axle assembly, the stator 14 is rotatable on the spindle 10, hence will not transmit braking torque to the axle assembly. Upon the application of the brake mechanism the braking torque tends to urge the stator 14 to rotate on the spindle, said rotation being resisted by the shock absorber connection between the vehicle body 8 and the stator 14. Thus during brake application braking torque is distributed directly to the associated vehicle rather than setting up unwanted reaction in the axle assembly. Additionally, any arcuate movements of the spindle 10 about the main shaft 2 causes vertical movement of the stator connected shock absorber arm 22. Movement of the arm 22 causes the wedges 46 and 52 to engage related wedge surfaces on the shoes 36 which in turn urges the shoes outwardly and into engagement with the friction surface 34 of the cylinder 30. Thus the shock absorber arrangement frictionally snubs or cushions unwanted and sudden rotative movements of the spindle 10 and thereby hinders the setting up of oscillations in the axle assembly.

I claim:

1. In an axle assembly for supporting a related vehicle body, a main shaft rotatably journalled to the body, a spindle eccentrically carried by the main shaft for arcuate movement thereabout, a brake flange journalled on said spindle, a shock absorber having a connection to the vehicle, said absorber comprising a member having friction surfaces thereon, friction shoes in engagement with the surfaces, an arm operatively connected to the brake flange and extending into the member, wedge surfaces on the shoes, and wedge means carried by the arm in engagement with the wedge surfaces, whereby upon movement of the spindle and consequent movement of the arm along its own longitudinal axis relative to said body the shoes are urged to frictionally engage the surfaces.

2. An axle assembly for supporting a related vehicle body according to claim 1, wherein each of said shoes has upper and lower wedge surfaces spaced longitudinally of the member and arm, and said wedge means comprises a fixed wedge on the arm engaging the upper wedge surfaces, and a spring loaded movable wedge carried by the arm in engagement with said lower wedge surfaces.

3. In an axle assembly for supporting a related vehicle body, a main shaft having a journalled connection to the body, a spindle eccentrically carried by the main shaft for arcuate movement thereabout, a brake stator journalled on the spindle, and means to distribute torque forces to the body including a connection between the stator and body, and a shock absorber forming part of said connection, the movement of the spindle including movement in an arc approaching longitudinal movement toward and from the shock absorber, the shock absorber including frictional means operative to resist said movement of said spindle.

4. An axle assembly for supporting a related vehicle body according to claim 3; wherein said shock absorber includes an arm member and a base member relatively movable, friction surfaces on one of said members, and spring loaded friction shoes connected to the other member and actuable thereby to engage the surfaces.

5. In an axle assembly for supporting a related vehicle body, a main shaft having journalled connection to the body, a spindle eccentrically carried by the main shaft for arcuate movement thereabout, a brake stator journalled on the spindle, and means to distribute torque forces from the stator to the body and to snub arcuate movement of the spindle, said means comprising a cylinder pivotally connected to the body, a friction surface internally of the cylinder, friction shoes within the cylinder in engagement with the surface, said shoes having upper and lower converging wedge surfaces, an arm having one end thereof secured to said stator and its other end extending into the cylinder and intermediate said shoes, a wedge on the end of the arm inside of the cylinder, a spring seat secured to the arm intermediate the ends thereof, a movable wedge on the arm intermediate the seat and the first mentioned wedge, and spring means interposed between the seat and the movable wedge operative to urge the first mentioned wedge into engagement with the upper wedge surfaces and the second mentioned wedge into engagement with the lower wedge surfaces.

6. In an axle assembly for supporting a related vehicle, a main shaft having journalled connection to the vehicle, a spindle eccentrically carried by the main shaft and rotatable thereabout, a brake stator journaled on said spindle, means to snub rotational movement of said spindle and to resist rotational movement of said stator, said means including a shock absorber including a first member connected to the body and having at least one friction surface, at least one friction shoe engaged with the surface and movable longitudinally relative to said first member, an arm having at one end thereof an operative connection to the stator, said arm having at the other end thereof an operative connection to the shoe, whereby movement of the spindle causes movement of the arm, longitudinally relative to the arm and to said first member, which in turn urges the shoe to engage said friction surface.

7. In an axle assembly for supporting a related vehicle body, a main shaft having a journalled connection to the body, a spindle eccentrically carried by the shaft, a brake stator journaled on the spindle, and means interconnecting the stator and the body, said means having telescoping members relatively movable longitudinally and being operative to transmit braking torque on the stator to the body and having friction surfaces operative to snub movement of said spindle.

8. In a structure of the type described, a vehicle body having a shaft journaled thereon, a spindle eccentrically carried by said shaft, a brake flange journaled on said spindle, a telescopic shock absorbing device having one end thereof rigidly secured to the flange and the other end pivotally connected to said body to prevent rotation of said flange and to yieldably resist rotation of said shaft.

9. A structure according to claim 8, in which said device comprises a hollow member pivotally connected to the vehicle, friction surfaces carried by said member internally thereof, a plurality of friction shoes in engagement with said surfaces, an actuating arm connected to the flange, and wedge means operatively associated with the actuating arm and engaging the shoes.

10. In a structure of the type described, a vehicle body having a shaft journaled thereon, a spindle eccentrically carried by said shaft for arcuate movement about the axis of the shaft, a brake flange journaled on said spindle, and a combined torque and shock absorbing device comprising coaxial telescopically engaged members, one of said members being rigidly secured to said flange and said other member being pivotally connected to said body, said members coacting to resist rotational movement of said flange responsive to braking torque and to yieldably resist arcuate movement of said flange and spindle about the axis of said shaft.

References Cited in the file of this patent

UNITED STATES PATENTS

| | | |
|---|---|---|
| 1,619,035 | Rafter | Mar. 1, 1927 |
| 1,797,929 | Rouanet | Mar. 24, 1931 |
| 1,982,853 | Brainard | Dec. 4, 1934 |
| 1,991,911 | Riley | Feb. 19, 1935 |
| 2,136,586 | Dubonnet | Nov. 15, 1938 |
| 2,426,513 | Linn | Aug. 26, 1947 |
| 2,483,974 | Hicks et al. | Oct. 4, 1949 |
| 2,574,788 | Janeway et al. | Nov. 13, 1951 |
| 2,660,449 | MacPherson | Nov. 24, 1953 |